US008038119B2

(12) United States Patent
Bachmaier et al.

(10) Patent No.: US 8,038,119 B2
(45) Date of Patent: Oct. 18, 2011

(54) METERING DEVICE

(75) Inventors: Georg Bachmaier, München (DE); Bernhard Fischer, Töging A. Inn (DE); Bernhard Gottlieb, München (DE); Andreas Kappel, Brunnthal (DE); Tim Schwebel, München (DE)

(73) Assignee: Siemens Aktiengesellschaft, Munich (DE)

( * ) Notice: Subject to any disclaimer, the term of this patent is extended or adjusted under 35 U.S.C. 154(b) by 1181 days.

(21) Appl. No.: 10/595,159

(22) PCT Filed: Sep. 10, 2004

(86) PCT No.: PCT/EP2004/052130
§ 371 (c)(1), (2), (4) Date: Feb. 20, 2007

(87) PCT Pub. No.: WO2005/026532
PCT Pub. Date: Mar. 24, 2005

(65) Prior Publication Data
US 2007/0131884 A1 Jun. 14, 2007

(30) Foreign Application Priority Data
Sep. 12, 2003 (DE) .................................. 103 42 308

(51) Int. Cl.
*F16K 31/12* (2006.01)
(52) U.S. Cl. ..................................... 251/54; 251/129.06
(58) Field of Classification Search .................... 251/54, 251/129.06, 57; 239/533.2–533.5, 584, 102.2
See application file for complete search history.

(56) References Cited

U.S. PATENT DOCUMENTS

| | | | | |
|---|---|---|---|---|
| 2,922,614 | A * | 1/1960 | Nickells | 251/54 |
| 3,418,980 | A * | 12/1968 | Benson | 123/294 |
| 4,725,002 | A * | 2/1988 | Trachte | 239/102.2 |
| 6,953,158 | B2 | 10/2005 | Liskow | 239/102.2 |
| 2002/0139863 | A1 | 10/2002 | Lorraine et al. | 239/5 |
| 2003/0042325 | A1 | 3/2003 | D'Arrigo | 239/102.2 |
| 2003/0098428 | A1 | 5/2003 | Mattes | 251/57 |
| 2003/0150939 | A1 | 8/2003 | Lorraine et al. | 239/533.2 |

FOREIGN PATENT DOCUMENTS

DE 198 26 341 A1 12/1999

(Continued)

OTHER PUBLICATIONS

Notification of International Search Report, International Search Report in German & English Translation of Search Report; PCT/EP2004/052130; 14 Pgs, Dec. 2004.

(Continued)

*Primary Examiner* — John Fristoe, Jr.
*Assistant Examiner* — Andrew J Rost
(74) *Attorney, Agent, or Firm* — King & Spalding L.L.P.

(57) ABSTRACT

A metering device has an actuating unit within a housing in which an actuator is inserted and a hydraulic compensating element. The hydraulic compensating element is connected to the actuator and can be filled with a fluid when subjected to pressure. A first end of the actuator is provided with a first end cap. The metering device further has a stop that is disposed on the housing in the form of a seat, faces the first end cap, and defines a stopping position for the first end cap. The stop maintains a maximum distance between a sealing element and the end cap, the distance being smaller than the actuator traveling distance such that the actuator stroke beyond the end cap is sufficient for opening the valve. The first end cap hits the stop when moving in the direction of the hydraulic compensating element such that the movement is blocked.

20 Claims, 5 Drawing Sheets

FOREIGN PATENT DOCUMENTS

| | | | |
|---|---|---|---|
| DE | 199 29 589 | A1 | 1/2000 |
| DE | 199 50 762 | A1 | 4/2001 |
| DE | 101 62 250 | A1 | 7/2003 |
| EP | 0 324 905 | A1 | 7/1989 |
| EP | 0 869 278 | A1 | 10/1998 |
| JP | 61008462 | | 1/1986 |

OTHER PUBLICATIONS

Written Opinion in German from PCT/EP2004/052130; 5 Pgs, Dec. 2004.

PCT International Search Report PCT/EP2004/052130, 2 pages, Dec. 14, 2004.

* cited by examiner

METERING DEVICE

ROSS-REFERENCE TO RELATED APPLICATIONS

This application is a U.S. national stage application of International Application No. PCT/EP2004/052130 filed Sep. 10, 2004, which designates the United States of America, and claims priority to German application number 103 42 308.7 filed Sep. 12, 2003, the contents of which are hereby incorporated by reference in their entirety.

TECHNICAL FIELD

The invention relates to a metering device, especially with an actuator unit as a drive for a valve in a common-rail diesel injector.

BACKGROUND

Mechanical tolerances, temperature-related and pressure-related changes in length, the effects of aging, especially in a PMA (Piezoelectric Multilayer Actuator), referred to below as a "piezoactuator" in a fluid valve, have a direct effect on the opening stroke of the fluid valve connected to the piezoactuator and thereby on the metered quantity. Conventional methods used to compensate for temperature-related changes in length to the piezoactuator based on suitable combinations of materials however present serious stability and manufacturing problems.

The elongation ratio of the piezoactuator which can be achieved by the inverse piezoelectric effect in high-performance ceramics as a result of the application of a maximum field strength of appr. 2 KV/mm permissible for continuous operation only amounts to 1.2-1.4 promille (that is 1.2-1.4 pm elongation per 1 mm length of the piezoactuator). For a typical length of piezoactuator of appr. 40 mm and a piezolayer spacing of 80 μm at 160V applied voltage, the inverse piezoelectric effect produces an elongation of maximum 56 μm. Thus if there is only a minimal relative deviation in the effective coefficient of thermal expansion of appr. 1*10−6 1/K over the length of the piezoactuator of 40 mm between the piezoactuator and the housing in which the piezoactuator is installed, in the range of temperatures of 40° C. to 140° C. relevant to automotive technology, this leads to a deviation of the reference surfaces relevant for valve operation of −2.4 μm to +4.8 μm or in total to 7.2 μm, and relative to the elongation of the piezoactuator to a variation bandwidth of up to 13%.

In addition the complex process steps in manufacturing, starting with the construction of the piezoactuator ceramics through to the polarization process, lead to component tolerances which make it difficult to keep the temperature expansion of the piezoactuator within a sufficiently narrow field of tolerances.

Since the piezoactuator is a component with a domain structure and hysteresis the temperature expansion coefficient is heavily dependent on the polarization state and the previous history of mechanical and electrical stress on the piezoactuator. The dependency of the length of the piezoactuator on temperature is non-linear. The coefficient of thermal expansion can assume values for the same piezoactuator ranging from $-5*10^{-6}$ 1/K up to $+7*10^{-6}$ 1/K [1].

The positive change in length caused by the electrical charging of the piezoactuator is used in current common rail diesel injectors to close a sealing element. For reasons of tolerance in this case a "thermal gap", that is a safety margin of typically 3-5 pm between the freely-moveable end of a piezoelectric actuator unit (PAU) which is embodied as a plunger or which is rigidly mechanically coupled to a plunger and the sealing element is provided. The PAU consists of an upper end cap which is mechanically rigidly supported and which contains at least one whole through which the electric connections of the piezoactuator can be routed outwards, a lower end cap which is embodied as a plunger or which is mechanically rigidly coupled to a plunger, the piezoactuator and a tubular spring into which the piezoactuator is welded under a pre-tensioning pressure of appr. 600N-800N between the two end caps. It is not possible to ideally strike a thermal balance between the actuator housing and the PAU. The safety margin is used, in the event of a greater thermal expansion of the PAU relative to the actuator housing, so that the sealing element is opened and there is continuous leakage through the servo valve as a result. However the fluctuations in the PMA temperature coefficients make it clear that even such a margin is not always sufficient.

Directly after the injector is switched off (the motor vehicle or engine is switched off) units of the injector are at high temperature. The associated thermal expansion of the piezoactuator relative to the housing which cannot be perfectly tuned can lead to the thermal margin being exceeded and the sealing element being opened despite lack of piezo activation, particularly if in the off state no opposing force $F_0$ caused by the fluid pressure can operate on the sealing element any longer. The sealing element thus remains open in the switched-off state of the engine.

The fluid pressure which is exerted on the sealing element from the other direction can however subsequently in the switched-on state of the injector reach a pressure of up to 2000 bar and give rise to forces or opposing forces of up to 600 N. During injector operation these forces ensure a defined closure of the sealing element despite an overextension of the actuator. An internal high-pressure pump in the motor vehicle, when another attempt is made to start the engine, and thereby the injector, is however no longer in a position if the injector is still hot, to build up the necessary pressure in order to close the sealing element so that this leads to malfunctions of the injector.

An actuator unit A in accordance with the prior art is shown in FIG. 1. It consists of a housing 1, a piezoactuator 2 with a tubular spring 8, a first and a second end cap 3, 7, with the first end cap 3 being provided with a plunger 4. The piezoactuator 2 is welded into the tubular spring 8 under a pre-tensioning pressure of appr. 600 to 800 N in order to avoid damaging tensile stresses during operation. A membrane 5, typically made of metal, enables a seal to be provided between the piezoactuator and fuel. The second end cap 7 is supported against the housing 1 whereas the first end cap 3 on activation presses together with the plunger 4 against the sealing element 6 of the seating valve 12. In the zero-pressure state the sealing element 6 implemented as a ball, is held in the seat 12 with the aid of a weak return spring (not shown) at the pressure of approximately 5N. In the normal state (no activation of the piezoactuator) there is a safety margin between the sealing element 6 and the piston 4 of typically 3 to 5 μm.

In this layout a stronger thermal expansion of the piezoactuator 2, because of its attachment via the end cap 7 to the fixed end of the housing 1 leads to an extension of the piezoactuator in the direction of the valve seat 12.

It should however be pointed out that thermal changes are not short term processes in the range of below 10 ms but take seconds or minutes to occur. This type of slow expansion of the actuator 2 can however be balanced out by a hydraulic compensation element X, as shown in FIG. 1*a*. Such a hydraulic compensation element X is preferably seated between the end cap 7 of the actuator 2 and the other end of the housing 1 and is attached to the housing. When this type of hydraulic compensation element is used the thermal expansion of the actuator now occurs in the direction of the end cap 7 and does not absolutely lead to a change in the distance between the sealing element 6 and the plunger 4 and thus also does not lead to permanent leakages.

The hydraulic compensation element X however exhibits a stiffness comparable with a rigid body when force is applied to it for short periods, in which case despite this stiffness the hydraulic compensation element or a component of the hydraulic compensation element which is connected indirectly or directly to the piezoactuator gives way by a negligible amount. However these distances, which are in themselves negligible, add up with multiple activation of the piezoactuator so that the hydraulic compensation aliment or the component of the hydraulic compensation element is shifted upwards by the maximum deflection of the piezoactuator and thereby the gap between the piston 4 and the sealing element 6 is enlarged such that the piston no longer reaches this sealing element on repeated actuation of the piezoactuator. Opening the sealing element 6 is no longer possible in this case.

SUMMARY

The object of the invention is thus to specify a device and/or a method by which a predetermined distance between a sealing element and an actuator unit can be constantly maintained.

The object is achieved by a metering device comprising:

an actuator unit comprising a housing with an actuator inserted into the housing a hydraulic compensation element which is connected to the actuator, with a first end of the actuator been provided with a first end cap a stop in the form of a seat being arranged on a housing which lies opposite the first end cap and defines a stop position for the first end cap the stop maintains a maximum distance between a sealing element of a valve unit and the end cap, in which case the distance is smaller than the deflection length effected by the actuator and the deflection length over the end cap is sufficient to open the valve with a movement of the first end cap in the direction of the hydraulic compensation element, the end cap hits the stop and this movement is blocked.

This metering device provides the advantage that even with fluctuating operating temperatures a smallest possible distance between the sealing element and the actuator is maintained. This always guarantees an opening of the sealing element by the actuator, with the compensation for the temperature expansion of the actuator able to be achieved by the hydraulic compensation element being able to be maintained.

In the method for manufacturing the inventive metering device the first end cap is moved past the stop and using a subsequent second rotation of the end cap and the stop they are opposite each other so that, with a movement of the end cap in the direction of the hydraulic compensation element the end cap hits the stop and this movement is blocked.

The method corresponds to a simple key-lock relationship between the end cap and the stop. It is especially suitable and safe for simple manufacturing of the metering device.

The key-lock relationship preferably represents a bayonet lock.

The actuator is preferably a piezoactuator.

BRIEF DESCRIPTION OF THE DRAWINGS

Further benefits and a more detailed explanation of the invention are given on the basis of the following exemplary embodiments.

The Figures show.

DETAILED DESCRIPTION

Figure 1:
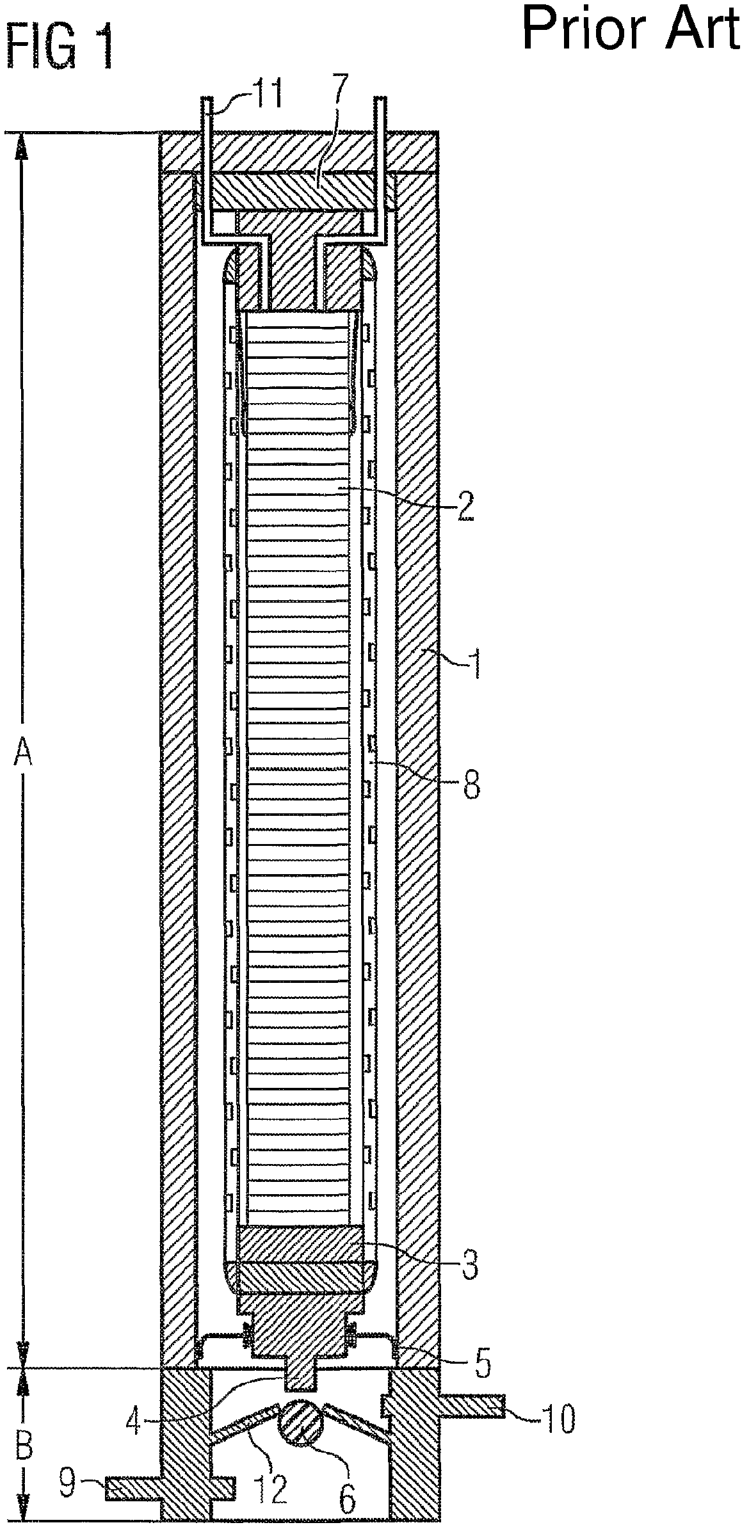
FIG 1 Prior Art
FIG. 1 shows a conventional metering device.
Figure 1A:
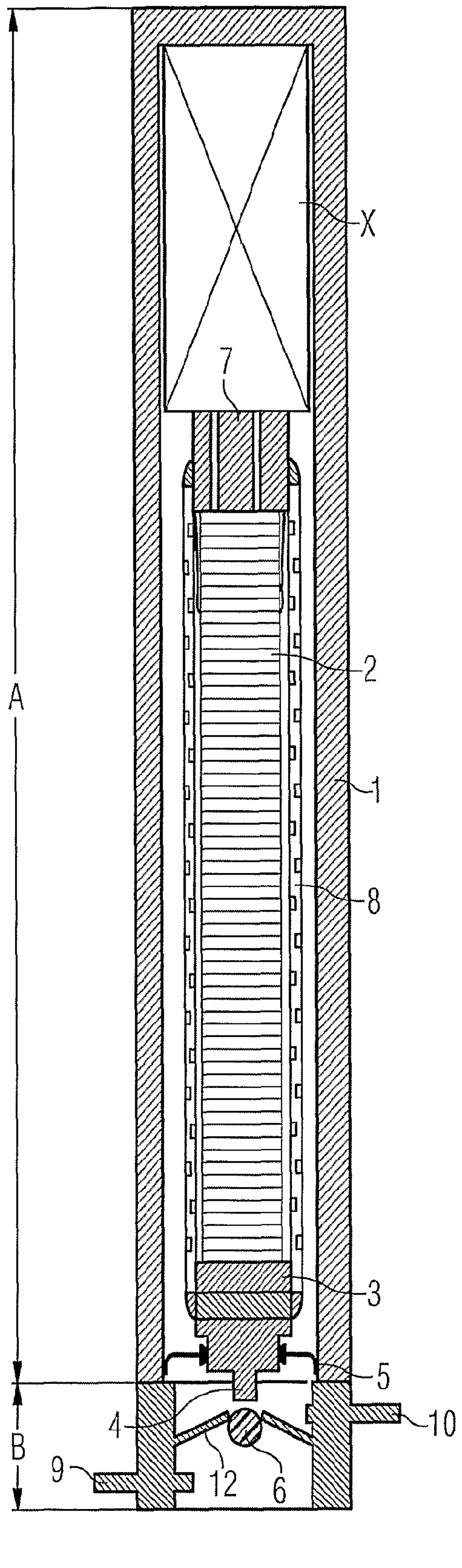
FIG 1A Prior Art
FIG. 1A a metering device with a stop arrangement and a hydraulic compensation element.
Figure 2:
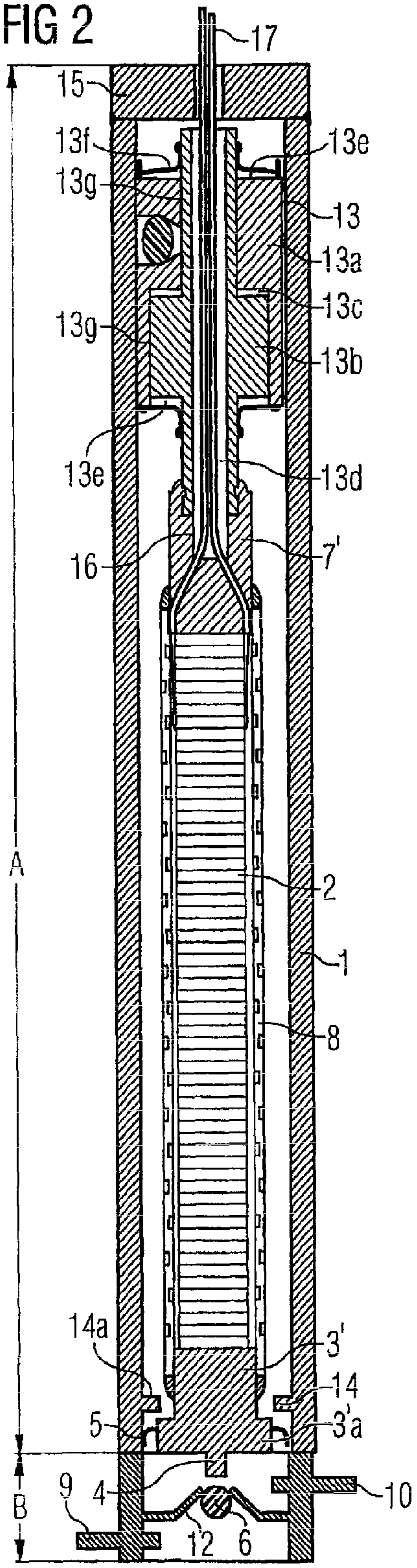
FIG. 2 shows a metering device with the known features from FIG. 1 an already mentioned hydraulic compensation element 13, modified end caps 7', 3' and a stop 14, FIG. 3 examples of the geometry of an end cap, FIG. 4 the end cap guided through a housing and depicted in FIG. 3, and FIG. 5 a three-dimensional view of the end cap guided through the housing.

The hydraulic compensation element 13 can be installed in the metering device in a simple manner between an end of the housing 1 and the piezoactuator 2, a process which advantageously simplifies the integration into or modification of existing injectors. The hydraulic compensation element is preferably fixed to the inner wall of the housing 1.

The hydraulic compensation element 13 is basically rigid in relation to the brief application of a force and simultaneously gives way to a thermally-induced change in length of the actuator.

The hydraulic compensation element 13 preferably features at least one hydraulic chamber 13*c*, a hollow-cylinder-shaped housing 13*a* and a piston 13*b*, with the piston 13*b* or the housing 13*a* being connected to the second end cap 7' of the actuator 2. The hydraulic chamber 13*c* lies between axially effective pressure surfaces of the piston and the housing in each case and between at least two clearances 13*g*, which are embodied between the piston and the housing. The axially effective pressure surfaces are essentially aligned axially. The term "axial" is understood as being the direction of the force effects and transmissions of the piezoactuator or of the hydraulic compensation element. "Axial" is however also taken to mean "essentially axial". The clearances 13*g* basically have a strongly fluid-restricting effect. The hydraulic compensation element can be filled under pressure with a fluid, preferably silicon oil. It his preferred that the hydraulic compensation element features an axial through-hole 13*d* through which the leads 17 to the piezoactuator 2 can be routed. In particular the piston 13*b* is provided with this through-hole 13*d*.

The piston 13*b* and the housing 13*a*, with a slow thermally induced length change of the actuator are able to be displaced relative to each other without any force being exerted so that the hydraulic compensation element gives way during this time. With a brief application of a force the piston only moves by a negligible amount relative to the housing however so that the hydraulic compensation element can be considered as being rigid.

It is also preferred that the hydraulic compensation element for increased rigidity features several, especially two, hydraulic chambers. In this case the housing 13*a* a is expanded by a part to form a further hydraulic chamber similar to the first hydraulic chamber 13*c* between the piston 13*b* and the housing 13*a* as previously stated. The hydraulic compensation element would operate bidirectionally in this case.

The hydraulic compensation element 13 is provided with membranes 13*f* on its two end faces which preferably are attached to the piston 13*b* and the housing 13*a*. Through the membranes storage volumes 13*e* are embodied between the housing, the membranes and the piston. The membranes can also expand at increased temperature so that they can compensate for a thermal volume change of the fluid in the hydraulic compensation element. They each preferably have coefficients of thermal expansion which differ from those of the housing and/or the piston. The membranes of preferably embodied as annular flat membranes.

It is preferable for the hydraulic compensation element to be hydraulically connected via a hole in the housing 13*a* of the hydraulic compensation element with a compensation store in order to compensate for an increasing volume change of the fluid located in the hydraulic compensation element at increased temperature even better than with the previously mentioned membranes 13*f* and storage volumes 13*e*. The compensation store preferably features a membrane which can be implemented as an elastic sleeve and a storage volume enclosed below it. The elastic sleeve of the compensation store is preferably arranged on the lateral surface of the housing 13*a*. At increased temperature of the fluid the membrane expands so that the fluid in the hydraulic compensation area has a greater volume at its disposal and thus no disruptive net force effect between the piston and the housing arises. To provides sufficient space for the expansion of the elastic sleeve of the compensation store between the housing 13*a* of the hydraulic compensation element and the inner wall of the housing 1 of the metering device, it is preferred that the housing 13*a* of a hydraulic compensation element is mechanically connected by means of a spacer to the inner wall of the housing 1 of the metering device.

The compensation store can however also be implemented in the form of an external hydrostore.

The piston 13*b* or the housing 13*a* are also preferably provided with axial holes, which connect the storage volume 13*e* to the hydraulic chambers 13*c*, in order to facilitate the fluid flowback during the blanking interval of the piezoactuator into the hydraulic chambers and into the storage volume. The openings of the holes are provided in such cases with non-return valves known as flapper valves, so that the opening of the holes close during a brief deflection of the piezoactuator and thereby the hydraulic compensation element remains rigid when a force is briefly applied to it. During the planking intervals of the piezoactuator the flapper valves open in these cases as a result of a pressure drop in the hydraulic chambers 13*c*.

With a hydraulic compensation element 13 of the type presented a smooth movement of the piston 13*b* relative to the housing 13*a* of the hydraulic compensation element must be guaranteed since otherwise its desired compensation function would not be provided or would only be provided to a limited extent. In this case clearance dimensions and tolerances of piston and housing are to be selected so that positive play is available. For a smooth and jolt-free movement between piston and housing a sufficient surface quality of the outside surface of the piston and/or the inner wall of the housing, especially a slight surface roughness as can for example be produced by grinding, and to avoid tilting, a suitable guide length, are advantageous. Compliance with the clearance dimensions of piston and cylinder is ensured such that not only in the assembly state but also in stationary and non-stationary operation of the hydraulic compensation element no sticking or friction-related slipping (stick-slip) of the piston in the housing can arise, for example through a stronger thermal expansion of the piston in relation to the housing or a stronger thermal contraction of the housing in relation to the piston. In non-stationary operation in particular and at higher operating frequencies, radial temperature gradients arise because of the high and greatly changing release of heat over time of the piezoactuator with simultaneous cooling by the fuel, which can lead to a differing thermal expansion of piston and cylinder and can result in sticking if the system is not designed correctly. This can be prevented by the following measures:

a.) the piston and the housing consist of the same material or materials with the same coefficients of thermal expansion. To avoid sticking a sufficiently large gap between a piston and cylinder in a range of 10 to 50 μm combined with a fluid of higher basic viscosity in the range of 100 to 1000 Centistokes with a sufficient guide length of the piston in the housing to avoid tilting is to be selected.

b.) If the piston heats up for example more than the housing as a result of a driver element connected to it, such as for example because of the piezoactuator (a not inconsiderable radial temperature gradient arises here) a material is then selected for the piston 3 with a lower thermal expansion which means that the piston does not begin to stick in narrow clearances 13*g*.

c.) If it can be assumed that the piston 13*b*, the hydraulic fluid and the housing 13*a* are always at around the same temperature, the temperature influence on the gap flow between the clearances 13*g* in the state of the hydraulic system when subjected to a load by the actuator can be compensated for in wide ranges if the piston has a suitably selected higher thermal expansion than the housing. The explanation is to be found in the fact that the viscosity of the hydraulic fluid reduces in accordance with an exponentially with temperature and the volume flow of the hydraulic fluids along the clearances increases exponentially accordingly. The volume flow in this case is proportional to the third power of the width of the clearances which can also be referred to as the size of fit. The size of fit increases linearly with temperature and thus the temperature effects on the size of fit and on the viscosity are opposing.

The housing 1 of the metering device is lengthened when necessary in comparison to the original layout shown in FIG. 1 to enable the hydraulic compensation element 13 to be accommodated. In this case the second end cap 7' is welded to the piston 13*b* of the hydraulic compensation element. The housing 1 is sealed in the upwards direction by a closure element 15, preferably a fixed support.

Despite this the relatively small space requirement of the hydraulic compensation element 13 with maximum rigidity for the metering device is especially advantageous for installation in an injector of a motor vehicle with the usual stringent space requirements in such cases.

The piezoelectric actuator unit PAU mentioned at the start of the description, referred to below as actuator unit A, comprises the arrangement of features which are mechanically indirectly or directly connected to the piezoactuator and features, in addition to the known features from FIG. 1 a first, lower and modified end cap 3' which is a equipped with a plunger B pointing towards the valve unit B. The valve unit B is taken to mean at least an arrangement which comprises the valve seat 12 and the sealing element 6. The valve unit can additionally have inlets and returns 9, 10 for the fuel. The end cap 3' is preferably frustoconical, with its lateral surface being stepped. In this case the end cap 3' should however feature at least two ears 3'*a*, of which the surfaces aligned essentially axially, in the opposite direction to the sealing element 6, on withdrawal of the actuator, come up against surfaces 14*a* of the stop 14 which are also aligned axially.

Below the stop 14 in the direction of the valve unit B a membrane 5 seals piezoactuator 2 against fuel in the metering device, which on opening of the sealing element 6 flows from the inlet 9 through the seat valve 12 to the return 10. The membrane 5 preferably connects the housing 1 to the end cap 3'.

The piezoactuator 2 is preferably also provided with a second upper end cap 7' which is connected to the hydraulic compensation element. It is preferred that the end cap 7' has an axial hole 16 for connecting leads 17, to simplify the contacting of the piezoactuator 2 to control electronics (not shown).

A significant element of the metering device is the stop 14, which counteracts a change in the position of equilibrium of the piston 13*b* of the hydraulic compensation element, and thus also the position of the end cap 3'.

The stop 14 can be seen as a tapering in the internal diameter of the housing 1. In this case the term "internal diameter" or "diameter" is always taken to mean a trans-axial diameter which runs at right angles to the longitudinal axis of the actuator. The stop is preferably penetrated by two holes. The stop allows the actuator to expand in the direction of the sealing element 6, but prevents the end cap 3' from withdrawing beyond a predefined distance from the sealing element 6. If the piston 3*b* of the hydraulic compensation element also wishes to remove itself from its position of equilibrium originally set, a force which pushes it back is produced as a result of the inelasticity of the piezoactuator, which after the activation voltage for the piezoactuator has been removed (the blanking interval) once again forces the piston 13*b* to return to its position of equilibrium originally set.

A fine adjustment of the maximum gap between the plunger 4 of the end cap 3' and the valve seat 12 can be obtained with the aid of shims. The requirements for the accuracy of this fine adjustment however are very small as a result of the compensating effect of the hydraulic compensation elements.

The stop 14 can be embodied in a plurality of variants. Of significance for an actual embodiment is its installation below the piezoactuator, to allow the expansion of the actuator upwards or in the opposite direction towards the sealing element.

Figure 3:
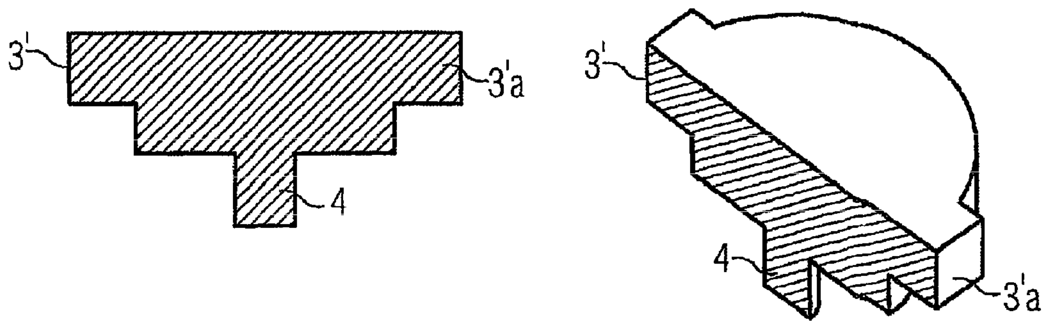

FIG. 3 shows the lower end cap 3' as a frustoconical form with a lateral surface which is provided with steps. The end cap in particular features two ears 3'*a* on the trans-axial surface of which an outer diameter of the end cap is present which is larger than the minimum internal diameter of the stop or of the taper 14 of the housing 1.

In the manufacturing of the metering device the ears 3'*a* of the end cap 3' are especially moved past the cutouts 14*a* of the stop 14. Subsequently the end cap is rotated so there a pulling back of the end cap means that the ears 3'*a* can no longer be moved past the stop.

Figure 4:
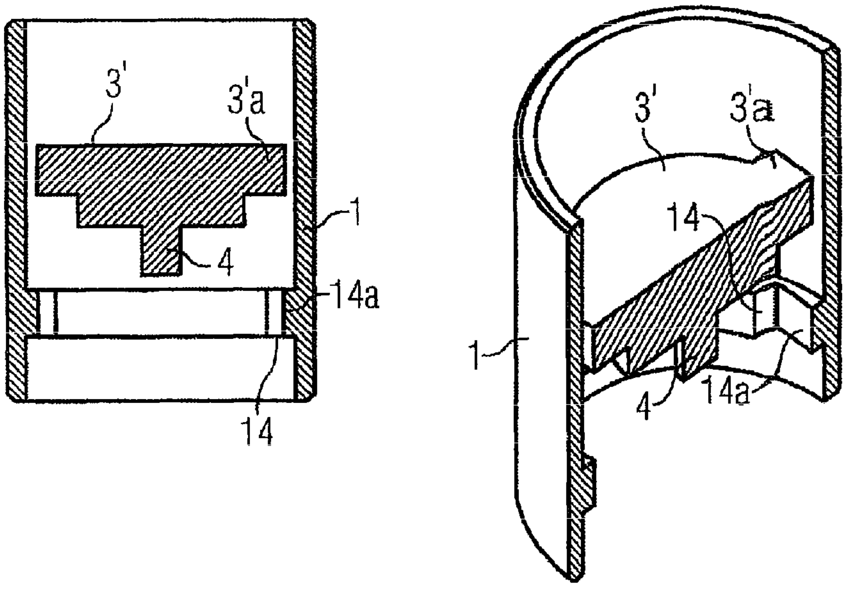

FIG. 4 shows how the end cap 3'*a* lies opposite the stop at 14 before the metering device is in its completely assembled state. In this case the cross sectional view on the left shows how the external dimension of the end cap 3' at the level of the ears 3'*a* is greater than the minimum internal diameter of the stop. The cutouts in the stop are shown by the number 14*a*. In the right hand three-dimensional view the arrangement of the cutout 14*a* and the stop in relation to each other can clearly be seen. In this case the position of the ears 3'*a* of the end cap in this view is such that the end cap 3' without being rotated can be moved past the stop in a straight line, in that the ears 3'*a* can be passed through the cutouts 14*a*. After the end cap 3' has been moved past the stop 14 it is rotated so that the ears 3'*a* and the cutouts 14*a* of the stop are no longer opposite each other axially and the ears 3'*a* would hit the stop 14 if the piezoactuator were withdrawn.

The end cap 3' is also basically the matching part for the stop 14 so that a key-lock arrangement is basically formed by the two parts. The stop and the end cap thus form a bayonet locking connection.

Figure 5:
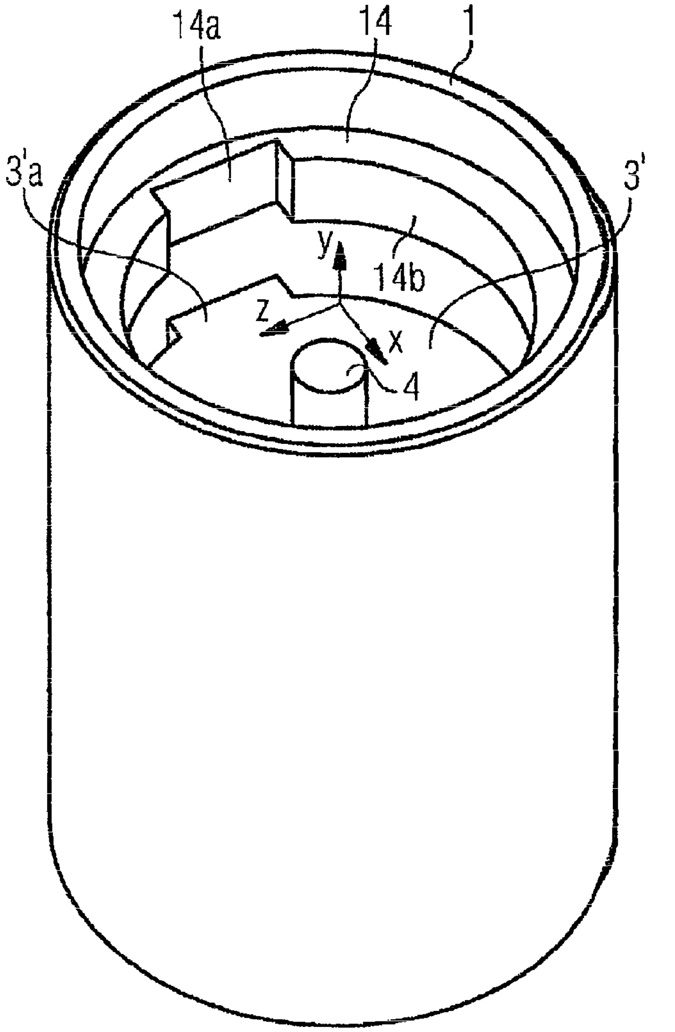

FIG. 5 shows a further three-dimensional view of the lower area of the metering device before it is in its assembled state. As shown in FIG. 4 the ears 3'*a* lie opposite the cutouts 14*a*, so that the end cap 3' can be moved past the stop 14.

A further option for embodiment of a stop 14 consists of a direct connection between the plunger 4 and the sealing element 6 of the seat valve 12, so that the plunger also takes over the role of the sealing element. When the end cap is withdrawn the valve seat itself then hits the stop element, since the sealing element or the plunger has a diameter so that it cannot move past the valve seat.

The stop 14 can also be replaced by an additional spring between piston 13*b* and the fixed support 15. The pre-tensioning of the spring in the manufacturing of the metering device ensures an effective downwards force which operates via the plunger 4 on the sealing element 6 of the valve unit B and operates against a change in the equilibrium position of the piston. This means that the piston is always subject to a reset force, to prevent a shift in the equilibrium position of the piston and guarantee a defined contact between the plunger and the sealing element.

Depending on the embodiment the elasticity of the membrane 5 is also suitable as a reset element for a desired equilibrium position. Welding of the membrane 5 onto the end cap 3' and onto the housing 1 ensures in this case that the end cap is prevented from turning in the position in which the cutouts 14*a* and the ears 3'*a* are opposite each other in the assembled state of the metering device, and the end cap is thereby accidentally pulled past the stop again.

It is preferred that the inventive metering device is used in a common-rail diesel injector.

The followed sources are cited within the context of this document:

[1] Lecture by Dr. Lubitz, Actuator Trade Fair, Bremen 2002

The invention claimed is:

1. A metering device, comprising:

an actuator unit comprising:

- a housing with an actuator introduced into the housing, and
- a hydraulic compensation element able to be filled under pressure with a fluid, which is connected to the actuator, wherein a first end of the actuator is provided with a first end cap, a stop is arranged in the form of a seat on the housing, which is opposite the first end cap and defines a stop position for the first end cap, the stop maintains a distance between a sealing element of a valve unit and the end cap, with the distance being smaller than the stroke distance effected by the actuator so that the stroke of the actuator via the end cap is sufficient to engage the end cap with the sealing element to open the valve, and wherein with a movement of the first end cap in the direction of the hydraulic compensation element the first end cap hits the stop and this movement is blocked.

2. A metering device according to claim 1, wherein the first end cap comprises a plunger pointing towards the valve unit.

3. A metering device according to claim 1, wherein the first end cap is frustoconical, with its lateral surface featuring steps.

4. A metering device according to claim 1, wherein the stop is embodied as a taper on the internal diameter of the housing.

5. A metering device according to claim 4, wherein the first end cap features two ears, on the trans-axial plane of which the end cap has an external dimension which is greater than the minimum internal dimension of the stop.

6. A metering device according to claim 1, wherein the actuator is provided with a second end cap which is connected to the hydraulic compensation element.

7. A metering device according to claim 6, wherein the second end cap comprises a hole for connecting leads.

8. A metering device according to claim 1, wherein the actuator is pre-tensioned by means of a tubular spring.

9. A metering device according to claim 1, wherein the hydraulic compensation element is rigid in relation to forces applied for short periods and gives way with a thermally induced change of length of the actuator.

10. A metering device according to claim 1, wherein the hydraulic compensation element comprises:

at least one hydraulic chamber, a housing, a piston which can be pushed into the housing, Storage volume which are sealed externally by means of membranes, wherein the piston or the housing is connected to the second end cap of the actuator.

11. A metering device according to claim 10, wherein the hydraulic compensation element features a number of hydraulic chambers for improved rigidity.

12. A metering device according to claim 10, wherein the hydraulic chambers are embodied between axially pressure surfaces of the housing and of the piston.

13. A metering device according to claim 10, wherein the piston or the housing comprises axial holes which connect the storage volumes with the hydraulic chambers, in which case the openings of the holes are provided with non-return valves.

14. A metering device according to claim 10, wherein, in the hydraulic compensation element of the piston and the housing each comprise different coefficients of thermal expansion.

15. A metering device according to claim 1, wherein the hydraulic compensation element is provided with an equalization store which allows for thermal changes of volume in the fluid in the hydraulic compensation element.

16. A method for manufacturing a metering device according to claim 1, in which the first end cap is moved past the uk/pond as a result of a subsequent turn, the end cap and the stop lie opposite each other such that, with a movement of the end cap in the direction of the hydraulic compensation element the end cap hits the stop and this movement is blocked.

17. A metering device, comprising:

an actuator unit comprising a housing with an actuator introduced into the housing, and a hydraulic compensation element able to be filled under pressure with a fluid, which is connected to the actuator, wherein a first end of the actuator is provided with a first end cap, a stop is arranged in the form of a seat on the housing, which is opposite the first end cap and defines a stop position for the first end cap, the stop maintains a distance between a sealing element of a valve unit and the end cap, with the distance being smaller than the stroke distance effected by the actuator so that the stroke of the actuator via the end cap is sufficient to engage the end cap with the sealing element to open the valve, with a movement of the first end cap in the direction of the hydraulic compensation element the first end cap hits the stop and this movement is blocked, and the first end cap is frustoconical, with its lateral surface featuring steps, and comprises a plunger pointing towards the valve unit.

18. A metering device according to claim 17, wherein the stop is embodied as a taper on the internal diameter of the housing.

19. A metering device according to claim 18, wherein the first end cap features two ears, on the trans-axial plane of which the end cap has an external dimension which is greater than the minimum internal dimension of the stop.

20. A metering device according to claim 17, wherein the actuator is provided with a second end cap which is connected to the hydraulic compensation element.

* * * * *